Patented May 14, 1940

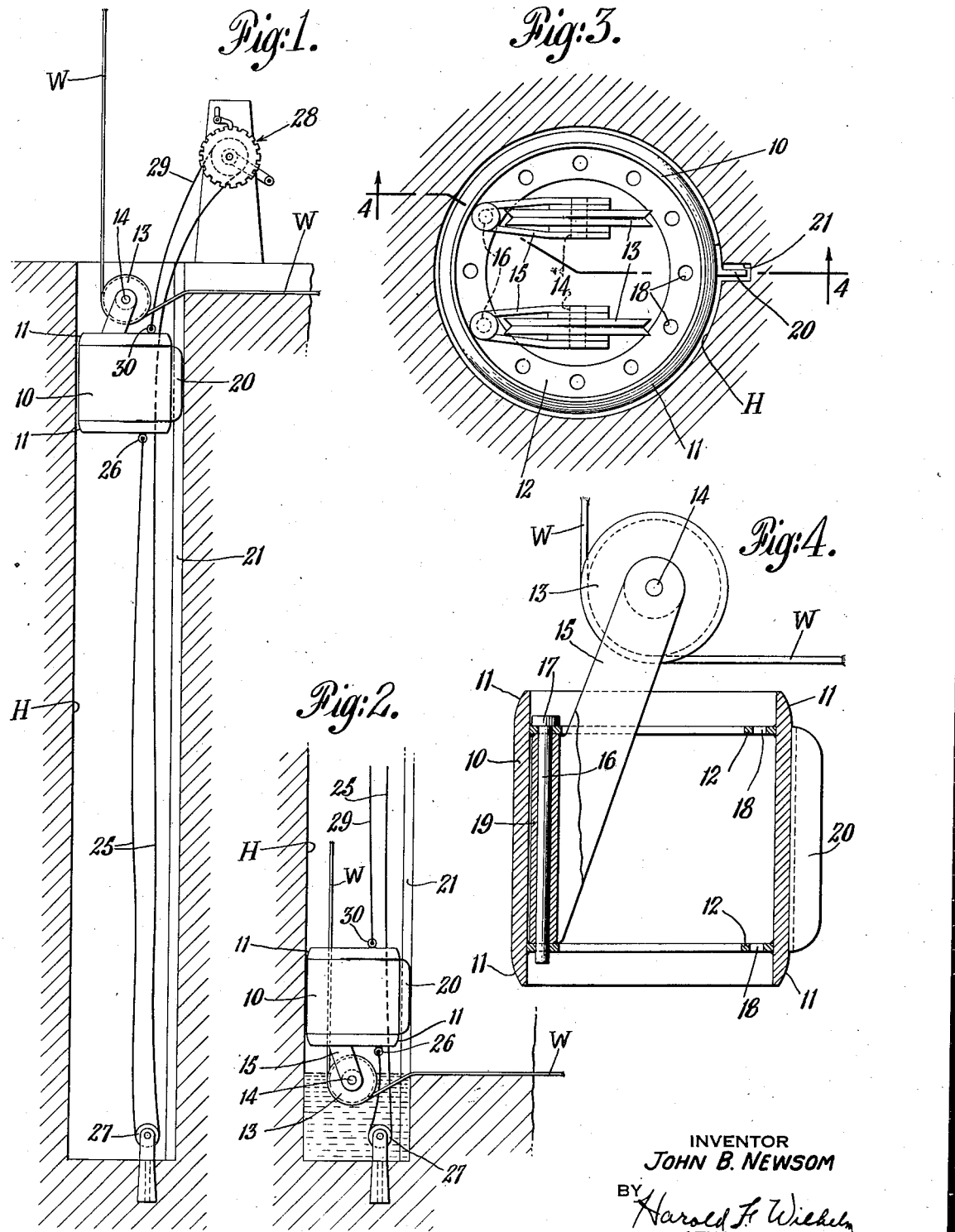

2,200,516

UNITED STATES PATENT OFFICE 2,200,516

DRILL HOLE SHEAVE CARRIER

John B. Newsom, Nevada City, Calif.

Application July 27, 1937, Serial No. 155,859
Renewed October 27, 1939

8 Claims. (Cl. 125—21)

This invention relates to wire sawing and, more particularly, to apparatus supporting and guiding a wire saw.

The present invention is adapted for use with a system of quarrying, such as disclosed in my Patent No. 2,050,761, granted August 16, 1936, although not limited to such a system. In the system of the prior patent, the wire saw sheaves are mounted on standards which extend from the bottom to the top of the ledge. Standards are expensive in first cost and quickly wear out, and are, furthermore, difficult to position and secure to the ledge. These standards are used not only in the open spaces adjoining the ledge, but also in drilled holes, such as the drill hole shown in the prior patent.

A feature of this invention is to provide a sheave carrier adapted for use with drill holes, which may be mounted directly within the drill hole without the necessity of supporting standard of any kind. According to a preferred embodiment of the invention, the sheave carrier comprises a tubular member or barrel of such size as to fit within the drill hole. The ends of the tubular member are tapered inwardly so as to facilitate sliding up and down in the drill hole. A web or flange projecting outwardly from the side of the tubular member slides within a vertical groove provided in the drill hole and thus prevents any turning movement of the tubular member during operations. One or more wire saw sheaves are mounted upon brackets which are hingedly connected to the tubular member, thus permitting the saw to adapt itself to sawing conditions. The brackets may be mounted in different positions around the wall of the barrel according to the desired position of the cut. The drill hole sheave carrier may be positioned in the drill hole with the sheaves facing upwardly or downwardly.

The invention also consists in certain new and original features of construction and combination of parts hereinafter set forth and claimed.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawing forming a part thereof, in which Fig. 1 is a side view of a drill hole sheave carrier as it appears when mounted within the drill hole and carrying a wire saw;

Fig. 2 is a view similar to Fig. 1, but showing the use of the carrier in inverted position;

Fig. 3 is a top view of the drill hole sheave carrier mounted in the drill hole as in Fig. 1; and Fig. 4 is a vertical cross sectional view through the drill hole sheave carrier, taken on the line 4—4 of Fig. 3.

In the following description and in the claims, various details will be identified by specific names for convenience, but they are intended to be as generic in their application as the art will permit.

Like reference characters denote like parts in the several figures of the drawing.

In the drawing accompanying and forming part of this specification, certain specific disclosure of the invention is made for purposes of explanation, but it will be understood that the details may be modified in various respects without departure from the broad aspect of the invention.

Referring now to the drawing, a vertical hole H is first drilled in the ledge at the end of the wire saw cut or cuts to be made. These holes may be made by existing methods and apparatus and may be, say, three feet in diameter, large enough for a workman to descend into. The drill usually makes a hole with reasonably smooth side walls. After the hole is drilled to the desired depth, a vertical groove or slot 21 may be cut in the hole wall by a carborundum grind wheel or by any other suitable apparatus. The groove 21 should be straight and should preferably be located out of line with the desired wire saw cut or cuts, although it is desirable to have this groove on the same side of the hole as the wire saw cuts.

The drill hole wire sheave carrier comprises a cylindrical drum or tubular member 10 which may be made of steel or other suitable metal, to fit within the drill hole H. The ends 11 of the tubular member 10 are tapered inwardly to aid in riding within the drill hole and in sliding over any irregularities in the hole wall.

A ring 12 is welded at each end of the tubular member 10, forming flanges. A plurality of spaced aligned apertures 18 are provided in the flanges 12. One or more wire sheaves 13 may be mounted on the drum 10. Each wire sheave 13 is rotatably supported on an axle 14, supported in the free end of a bracket 15 comprising spaced arms. The spaced arms of the bracket 15 are carried by a hinge sleeve 19 through which extends a hinge pin 16 having head 17, which also passes through a pair of aligned apertures.

Thus, the brackets 15 may be mounted in any position around the rings 12 simply by dropping the pin 16 through the desired pair of aligned apertures 18 and the hinge sleeve 19. It is also seen that the brackets 15 may be swung in an angular direction around the hinge pins 16 so as to permit the wire sheaves 13 to adjust themselves to any sawing position. The bracket is of sufficient length for the sheave 13 to project beyond the end of the tubular member 10. This facilitates adjustment of the wire around the sheave and makes it easier to oil the sheave bearings 14 and do other work on them while they are in the hole.

To prevent turning of the tubular member 10 when in operative position within the hole, a flange or wing portion 20 having rounded ends is welded or otherwise secured to the outside face of the tubular member 10. When the flange portion 20 is positioned within the slot 21, rotation of the tubular member 10 during operations is prevented. The tubular member 10 is, however, free to slide up and down in the drill hole as conditions require.

After the hole H is completed, the sheave carrier is then mounted in the hole in the position shown in Fig. 1 which is just beginning a cut. The wire saw W may be mounted in any well known manner to cut the ledge, it being led from sheave 13 over suitable sheaves (not shown) to the driving apparatus. A single wire saw cut may be made in which case one bracket 15 and sheave 13 will be used. In case two wire saw cuts are desired simultaneously, as from the hole 12 in the above prior patent, two brackets and sheaves are mounted on the barrel 10.

Under normal cutting operations, the barrel 10 is inserted in the hole as shown in Fig. 1 with the sheave 13 up. However, it is sometimes desirable to have the sheave 13 face down as in Fig. 2. In this position the wire saw W can cut all the way to the bottom of the hole. Also, when the hole is filled with sand and water or other muck, the wire saw cut always being below the barrel 10, the cutting movement of the wire saw away from the hole H carries the water and muck along with it, thus cleaning out the hole ahead of the barrel 10. The entire barrel assembly may be inverted or, if desired, merely the brackets 15.

For controlling the position of the carrier, as well as the tension on the wire saws W, a cord or rope 25 may be provided. This rope may be fastened to one end of the barrel 10 as at 26, run down under a pulley 27 journalled on a support anchored in the bottom of the hole, thence around a hand windlass 28 mounted adjacent the hole H. The windlass may have an "ontake" and an "offtake", the rope 25 winding onto the ontake. Another rope 29 fastened at 30 to the top of the barrel 10 winds onto the offtake on windlass 28.

In the condition shown in Fig. 1, both ropes 25 and 29 are slack and the weight of the sheave carrier is effective for cutting action. However, the rope 29 serves the purpose of preventing the carrier from dropping to the bottom of the hole should the wire saw W break. In case increased cutting pressure is desired, the windlass 28 is rotated to put rope 25 under tension which increases the force tending to press the wire saw W into the ledge. If decreased cutting pressure is desired, the windlass 28 is rotated to put rope 29 under tension. It will be understood that the windlass has suitable devices for holding its drum in adjusted position and that it may be used in the manner just described, also when the sheave 13 faces down.

The drill hole wire sheave carrier, as thus constructed, may be made at a low cost, is durable and lasting in use and efficiently performs the desired operation. With a hole 36 inches in diameter, the barrel 10 may be about 36 inches high and 34 or 35 inches in outside diameter, thus easily sliding in a 36 inch hole. Expensive wire sheave standards and auxiliary equipment, which often operate ineffectively, are thus dispensed with.

While certain novel features of the invention have been disclosed and are pointed out in the annexed claims, it will be understood that various omissions, substitutions and changes may be made by those skilled in the art without departing from the spirit of the invention.

What is claimed is:

1. A sheave carrier for a drill hole comprising a tubular member having inwardly tapered end portions permitting said member to smoothly telescope within the drill hole, a sheave, and a bracket connecting the sheave to the tubular member.

2. A drill hole sheave carrier comprising a tubular member shaped to smoothly telescope within the drill hole, a bracket pivotally connected to the tubular member, and a sheave rotatively mounted on said bracket.

3. A drill hole sheave carrier comprising a tubular member shaped to smoothly telescope within the drill hole, spaced flanges within said tubular member having a series of sets of aligned holes, a bracket, means pivotally connecting said bracket selectively to any one set of holes, and a sheave adapted to receive a wire saw rotatively mounted on said bracket.

4. A drill hole sheave carrier comprising a tubular member adapted to smoothly telescope within the drill hole, spaced flanges within said tubular member, a bracket pivotally connected to said flanges, the free end of said bracket extending outwardly beyond the end of said tubular member, and a sheave adapted to receive a wire saw rotatively mounted on the free end of said bracket.

5. In drilling apparatus, a drill hole sheave carrier comprising a tubular member shaped to smoothly telescope within the drill hole, a bracket adjustably and pivotally connected to the tubular member, a sheave rotatably mounted in said bracket, means for raising and lowering the sheave carrier out of and into the drill hole, and means associated with the drill hole and sheave carrier operative to prevent turning of the tubular member therein.

6. In a sawing system, a ledge having a circular drill hole therein and a longitudinal guideway along the wall of said hole, a carrier within said hole and having longitudinal guiding engagement with the wall of said hole for movement lengthwise of said hole, said carrier having means interengaging with said longitudinal guideway to fix the circular position of said carrier, a sheave of less diameter than said circular drill hole, a bracket pivotally mounted on said carrier for supporting said sheave, and a flexible line attached to said carrier and extending to the open end of said hole for moving said carrier lengthwise of said hole.

7. In a sawing system, a ledge having a circular drill hole therein and a longitudinal groove in the wall of said hole, a carrier within said hole and having longitudinal guiding engagement with the wall of said hole for movement lengthwise of said hole, said carrier having a member projecting into said longitudinal groove to fix the circular position of said carrier, a sheave of less diameter than said circular drill hole, a bracket pivotally mounted on said carrier for supporting said sheave, and a flexible line attached to said carrier and extending to the open end of said hole for moving said carrier lengthwise of said hole.

8. In a wire saw system, a ledge having a hole driven therein, a carrier within said hole and having longitudinal guiding engagement with the wall of the hole for movement lengthwise thereof, a plurality of supports swiveled on said carrier for swinging movement independent of each other, a plurality of sheaves journalled respectively on said supports, a plurality of wire saws, one on each sheave for making simultaneously a plurality of different cuts in the ledge intersecting said hole as said carrier moves down into said hole, and a flexible line attached to said carrier and extending to the open end of said hole for raising and lowering said carrier in the hole.

JOHN B. NEWSOM.